United States Patent [19]
Barratt

[11] 3,721,805
[45] March 20, 1973

[54] OVEN CONTROL

[75] Inventor: John Barratt, Newton-le-Willows, England

[73] Assignee: Simon-Vicars Limited, Earlestown, Newton-Le-Willows, England

[22] Filed: Jan. 20, 1972

[21] Appl. No.: 219,453

[30] Foreign Application Priority Data

Feb. 11, 1971 Great Britain....................4494/71

[52] U.S. Cl................................................219/492
[51] Int. Cl................................................H05b 1/02
[58] Field of Search........99/326, 361, 362; 219/386, 219/387, 388, 492

[56] References Cited

UNITED STATES PATENTS

| | | | |
|---|---|---|---|
| 2,820,131 | 11/1958 | Kodama | 219/388 |
| 3,249,741 | 5/1966 | Mills | 219/388 |
| 3,515,854 | 6/1970 | Williams | 219/388 |
| 3,601,582 | 8/1971 | Boisfleury | 219/388 |

*Primary Examiner*—George Harris
*Assistant Examiner*—F. E. Bell
*Attorney*—William A. Strauch et al.

[57] ABSTRACT

A heat supply control means for a baker's oven through which products to be baked are carried from one end to the other on a travelling conveyor and which is divided into a plurality of zones, said heat supply control means comprising adjustable heat supply means in each zone, thermostatic temperature control means for controlling the heat input to all of said zones except one or more final zones at the downstream end of the oven, and means associated with said final zone or zones for controlling automatically the heat supply means thereto such that the radiation produced therein is sufficient when products to be baked are passing therethrough to ensure required texture and color.

12 Claims, 1 Drawing Figure

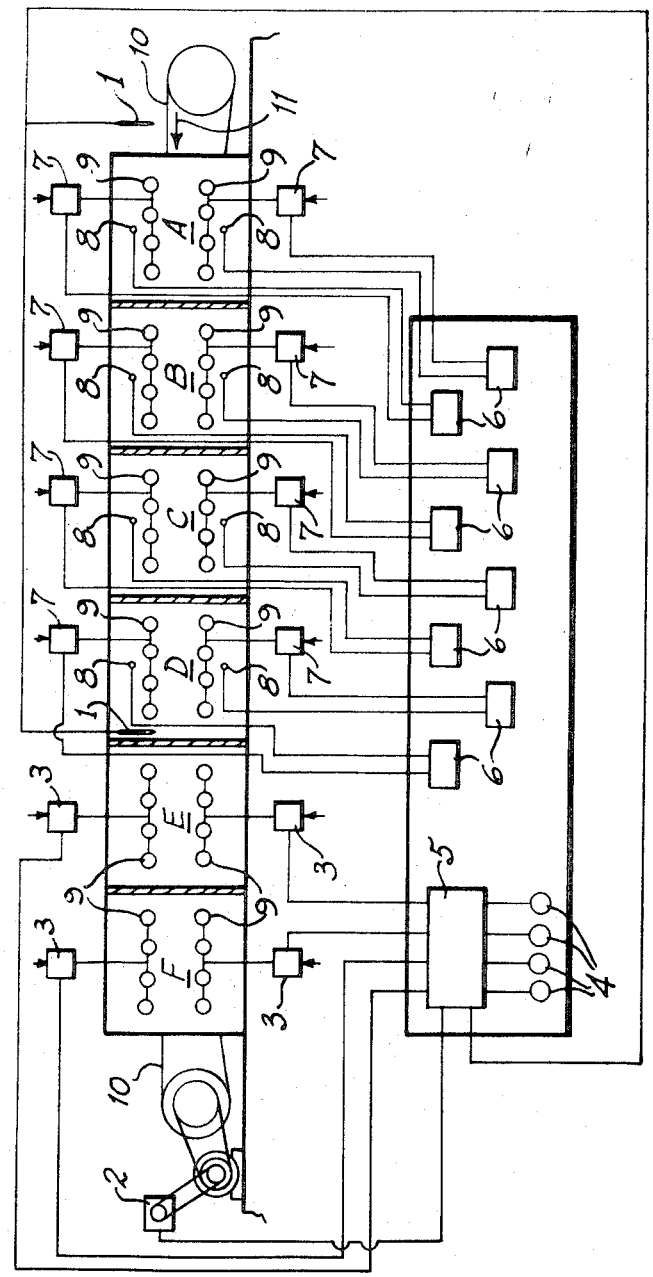

OVEN CONTROL

This invention relates to the baking of flour confectionery, in which the products to be baked are passed through an oven on a travelling conveyor, and more particularly to a heat supply control system for such an oven.

Such ovens are usually divided in the direction of travel of the products, into a number of control zones each of which has an independent heat supply system such as gas fired burners, and thermostatic temperature control means comprising sensors located above and below the conveyor, and controllers receiving signals from the sensors to modify the gas supply to the burners. The number of zones is such that the product is almost completely baked before it reaches the final zone or zones in which the radiant energy from the burners serves to render to the product the final texture and color, such being important factors in certain products such as biscuits.

It has been found that under certain operating conditions, for example, when there is a break in the feeding of products into the oven for a period there is a tendency for the temperature in the oven to rise above the control setting, particularly in the final zones owing to the heat from the preceding zones being carried forwards by the travelling conveyor. Consequent lowering of the heat input to the oven by the thermostatic control means results in the radiant energy output from the burners being too low in the final zones for required final texturing and coloring of the products at least initially when the feed thereof is once again restored.

It can be seen therefore that in order to achieve the required texture and color in the finished products without wastage, the radiation in the final zone or zones must be maintained whenever products are passing therethrough, at or above a certain predetermined level regardless of the temperature therein, and it is an object of this invention to provide a heat supply control system for a bakers' oven, adapted to ensure such maintenance.

According to the present invention there is provided a heat supply control means for a bakers' oven through which products to be baked are carried from one end to the other on a travelling conveyor and which is divided into a plurality of zones, comprising adjustable heat supply means in each zone, thermostatic temperature control means for controlling the heat input to all of said zones except one or more final zones at the downstream end of the oven, and means associated with said final zone or zones for controlling automatically the heat supply means thereto such that the radiation produced therein is sufficient when products to be baked are passing therethrough to ensure required texture and color.

Preferably said automatic control means includes adjustable means for pre-selecting the maximum radiation to be produced in said final zone or zones in accordance with a particular product to be baked. Furthermore, there is also preferably provided a timing device adapted, when no products are passing through the oven and after a predetermined time delay, to reduce the heat input to said final zone or zones to a pre-determined minimum.

The invention will be further apparent from the following description with reference to the single FIGURE of the accompanying drawing which shows, by way of example only, a diagrammatic representation of a bakers' oven embodying the invention.

Referring now to the drawing, there is illustrated a bakers' oven having six heat control zones A – F through which products to be baked are carried on a conveyor 10 travelling in the direction of the arrow 11.

In each of the zones A – D there is provided independent thermostatic temperature control above and below the transporting conveyor 10. The temperature control means for these zones is conventional. In each zone there are a number of gas-fired burners, 9, with gas supply lines controlled by valves 7, operated from conventional temperatures controllers 6, influenced by temperature probes 8, sensing the temperature within the zones above and below the conveyor 10, so that by presetting the temperature on the controllers 6, such temperature will be maintained in each zone according to its heat input demand.

In the final zones E and F, the heat input required above and below the transporting conveyor varies according to the product being baked. In these zones there are a number of burners 9 with gas supply lines controlled by valves 3 which are operated from adjustable maximum heat controllers 4, through a pressure controller 5. Before baking commences the maximum heat input required in zones E and F corresponding to the required degree of radiation is set on the heat input controllers 4. A reduced minimum heat input can be provided under the control of the pressure controller 5.

In accordance with the invention, sensing devices 1 are located respectively at the entrance to the baking chamber and at the end of the thermostatic temperature control zones. At the commencement of baking when the product passes through the sensing device 1 at the entrance to the baking chamber, the heat input to zones E and F is automatically adjusted to the amount pre-set by the controllers 4, and provided the product continues to feed into the oven, the burners remain at this setting. Linked to these sensing devices by controller 5 is a process timer 2 driven from the travelling conveyor 10. If there is a break in the feed of products to the oven while the conveyor continues to run which is longer than a pre-determined setting on the process timer 2, then after this pre-determined time delay, the heat input to zones E and F cycles to the minimum setting determined by controller 5. When the products re-commence to enter the oven, the heat input in zones E and F will not revert to the setting pre-set on the controllers 4 until the first products appearing after the break have passed below both sensing devices 1. Thus, when the first products are sensed by the downstream sensing device, the burners in zones E and F will be immediately restored to the pre-set maximum so that the required degree of radiation will be immediately restored and the first products will emerge with the required texture and color.

It can be seen therefore that the heat input to all of the zones, but particularly zones E and F, can be reduced to a minimum and thus prevent the oven from overheating in the event of a break in production, whereas the correct texture and color can be ensured as soon as production re-commences. This results in a considerable reduction in wastage of products baked in an oven of this kind.

It will be appreciated that it is not intended to limit the invention to the above example only, many variations such as might readily occur to one skilled in the art, being possible without departing from the scope thereof as defined by the appended claims.

What is claimed is:

1. A heat supply control means for a bakers' oven through which products to be baked are carried from one end to the other on a travelling conveyor and which is divided into a plurality of zones, said heat supply control means comprising adjustable heat supply means in each zones, thermostatic temperature control means for controlling the heat input to all of said zones except one or more final zones at the downstream end of the oven, and means associated with said final zone or zones for controlling automatically the heat supply means thereto such that the radiation produced therein is sufficient when products to be baked are passing therethrough to ensure required texture and color.

2. A heat supply control means according to claim 1, wherein said automatic control means includes adjustable means for pre-selecting the maximum radiation to be produced in said final zone or zones in accordance with a particular product to be baked.

3. A heat supply control means according to claim 2, including a timing device adapted, when no products are passing through the oven and after a predetermined time delay, to reduce the heat input to said final zone or zones.

4. A heat supply control means according to claim 1, including devices for sensing the presence or otherwise of said products, positioned respectively adjacent the entrance to the oven and the entrance to said final zone or zones.

5. A heat supply control means according to claim 3, including devices for sensing the presence or otherwise of said products, positioned respectively adjacent the entrance to the oven and the entrance to said final zone or zones.

6. A heat supply control means according to claim 5, wherein said sensing devices are connected to said timing device and are operative to reduce the heat input to said final zone or zones when a break in the supply of products is sensed by said first mentioned sensing device and after said predetermined time delay, and to increase said heat input to produce said pre-selected maximum radiation after said second mentioned sensing device has sensed commencement of feed of products.

7. A heat supply control means according to claim 1, wherein said thermostatic temperature control means comprises at least one burner located in each zone operated by an adjustable temperature controller influenced by a temperature probe located within the zone.

8. A heat supply control means according to claim 7, wherein there are provided two separately operable thermostatic temperature control means in each zone, one above and one below the travelling conveyor.

9. A heat supply control means according to claim 1, wherein said automatic control means in said final zone or zones comprises and adjustable controller adapted to operate at least one burner in the or each final zone selectively at a maximum or a minimum setting.

10. A heat supply control means according to claim 3, wherein said automatic control means in said final zone or zones comprises an adjustable controller adapted to operate at least one burner in the or each final zone selectively at a maximum or a minimum setting, said controller being operatively connected to said timing device.

11. A heat supply control means according to claim 3, wherein said timing device is driven by said travelling conveyor.

12. A heat supply control means according to claim 6, wherein said timing device is driven by said travelling conveyor.

* * * * *